(12) United States Patent
Bleloch

(10) Patent No.: US 7,537,280 B2
(45) Date of Patent: May 26, 2009

(54) BICYCLE SADDLE

(76) Inventor: John Andrew Bleloch, 87 Dundalk Avenue, Parkview 2193 (ZA)

( * ) Notice: Subject to any disclaimer, the term of this patent is extended or adjusted under 35 U.S.C. 154(b) by 0 days.

(21) Appl. No.: 10/596,143

(22) PCT Filed: Nov. 30, 2004

(86) PCT No.: PCT/IB2004/003908

§ 371 (c)(1),
(2), (4) Date: Jul. 25, 2006

(87) PCT Pub. No.: WO2005/054045

PCT Pub. Date: Jun. 16, 2005

(65) Prior Publication Data

US 2007/0069556 A1    Mar. 29, 2007

(30) Foreign Application Priority Data

Dec. 1, 2003    (ZA) ................... 2003/9335

(51) Int. Cl.
*B62J 1/00* (2006.01)
*B62J 1/02* (2006.01)
*B62J 1/10* (2006.01)

(52) U.S. Cl. .................. 297/201; 297/196; 297/207; 297/215.16

(58) Field of Classification Search .......... 297/201, 297/215.16, 207, 198, 197, 196, 195.1, 202, 297/208, 195.11, 284.11
See application file for complete search history.

(56) References Cited

U.S. PATENT DOCUMENTS

| | | | | | |
|---|---|---|---|---|---|
| 572,062 | A | * | 11/1896 | Peck | 297/201 |
| 603,734 | A | * | 5/1898 | Peck et al. | 297/201 |
| 604,955 | A | * | 5/1898 | Avery | 297/201 |
| 616,178 | A | * | 12/1898 | Barron | 297/201 |
| 623,505 | A | * | 4/1899 | Avery | 297/207 |
| 654,835 | A | * | 7/1900 | Mandl | 297/213 |
| 2,395,346 | A | * | 2/1946 | Schwinn | 297/207 |
| 3,446,532 | A | * | 5/1969 | Cramer | 297/312 |
| 3,883,173 | A | * | 5/1975 | Shephard et al. | 297/312 |
| 4,063,775 | A |  | 12/1977 | Mesinger |  |
| 4,089,559 | A | * | 5/1978 | Prange et al. | 297/201 |
| 4,369,998 | A |  | 1/1983 | Blase |  |
| 4,498,702 | A | * | 2/1985 | Raftery | 297/312 |
| 4,527,831 | A | * | 7/1985 | Katsuoka | 297/243 |
| 4,561,917 | A | * | 12/1985 | Urai | 156/73.1 |
| 4,877,286 | A | * | 10/1989 | Hobson et al. | 297/215.13 |
| 5,039,163 | A | * | 8/1991 | Tolleson | 297/297 |
| 5,203,606 | A | * | 4/1993 | Granzotto | 297/201 |
| 5,863,094 | A | * | 1/1999 | Endo | 297/201 |
| 5,904,397 | A | * | 5/1999 | Fismen | 297/291 |

(Continued)

FOREIGN PATENT DOCUMENTS

DE    91 361 C    3/1896

OTHER PUBLICATIONS

PCT International Search Report for PCT/IB2004/003908, dated Feb. 28, 2005 (4 pages).

*Primary Examiner*—Milton Nelson, Jr.
(74) *Attorney, Agent, or Firm*—Darby & Darby P.C.

(57) ABSTRACT

The invention concerns a bicycle saddle (1) having a seat portion (2) and a nose portion with the nose portion (9) longitudinally flexible and laterally rigid relative to the seat portion (2) wherein the degree of flexibility is adjustable.

8 Claims, 4 Drawing Sheets

U.S. PATENT DOCUMENTS 6,095,600 A * 8/2000 Mattingly ................... 297/201
6,139,098 A * 10/2000 Carrillo ...................... 297/202
6,254,180 B1 * 7/2001 Nelson ....................... 297/201
6,302,480 B1 * 10/2001 Hall ........................... 297/201
6,357,825 B1 * 3/2002 Bavaresco ................. 297/201
6,575,529 B1 6/2003 Yu

* cited by examiner

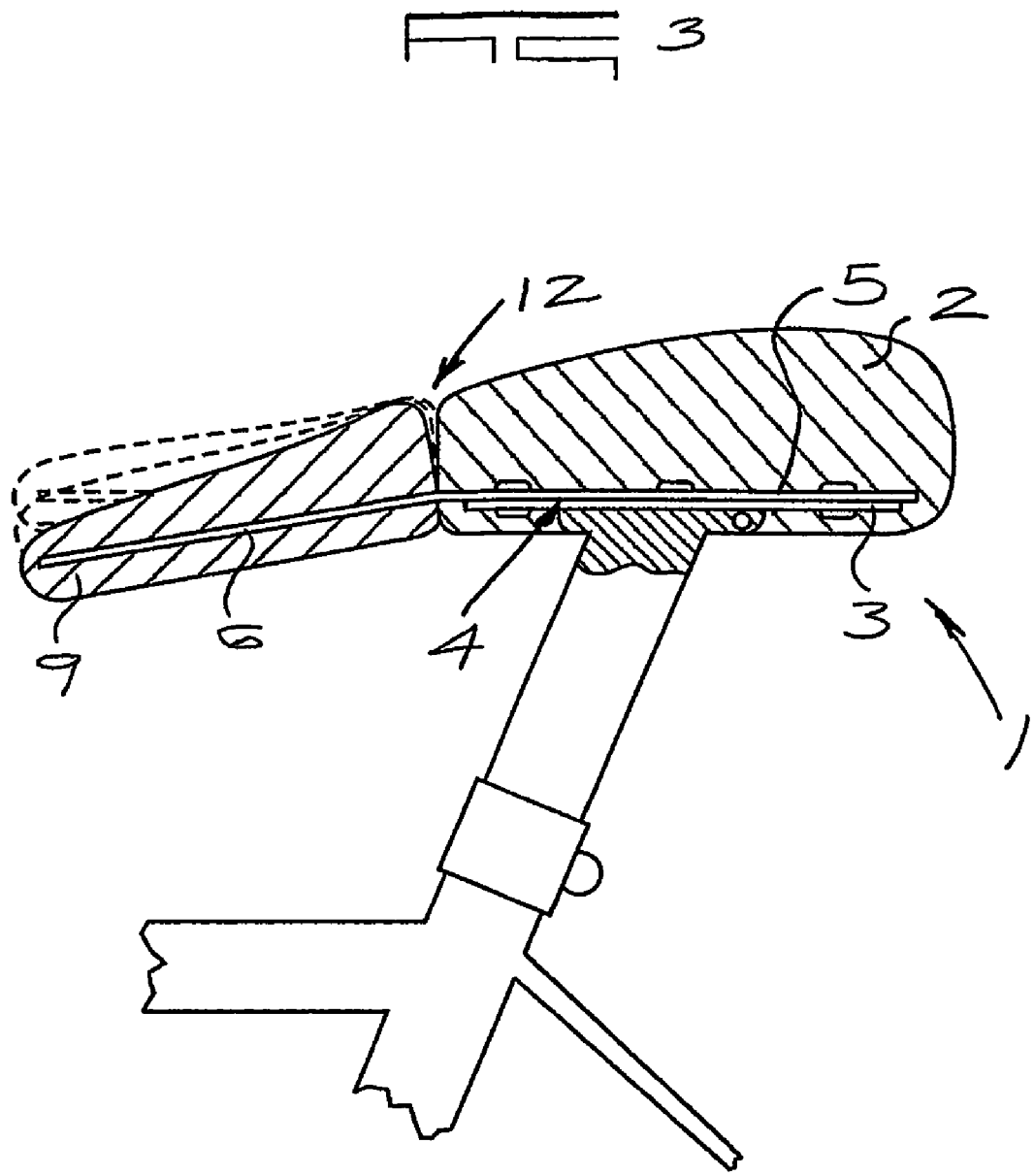

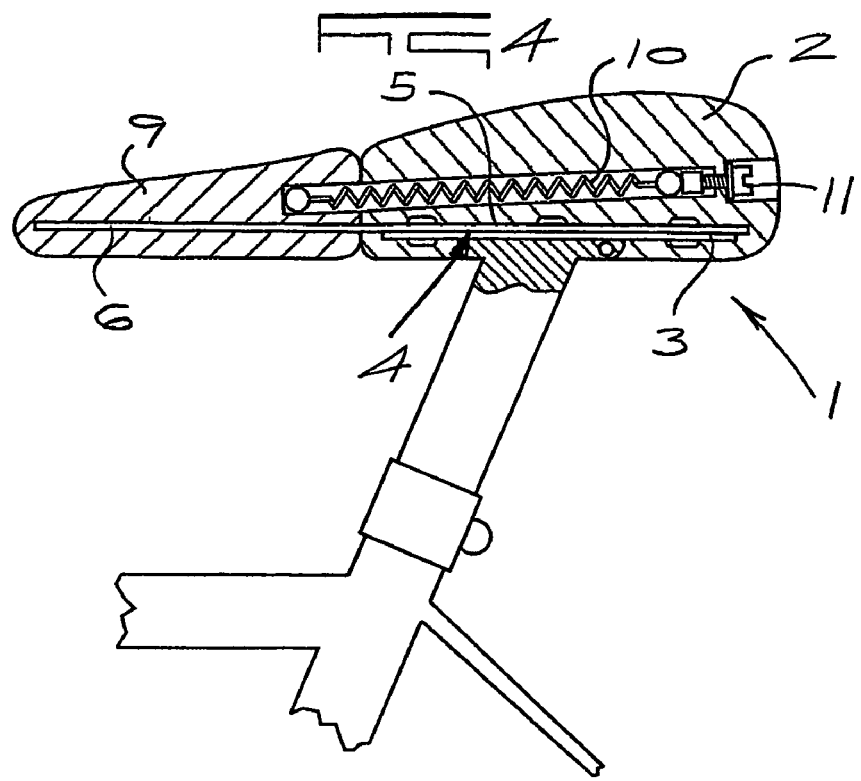
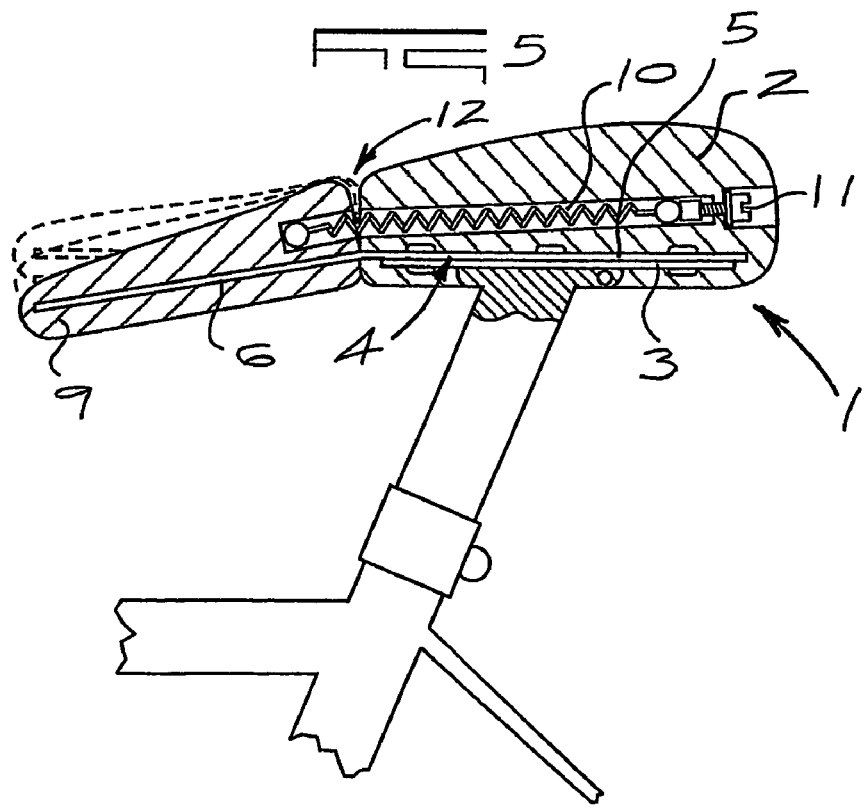

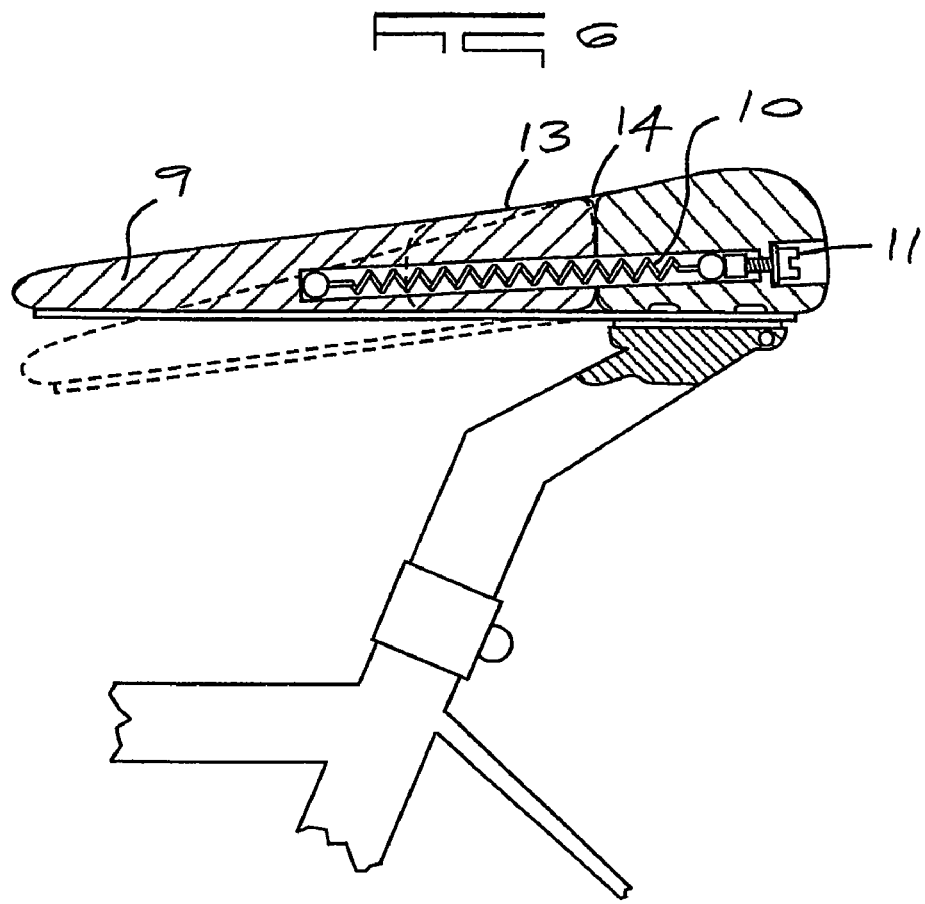
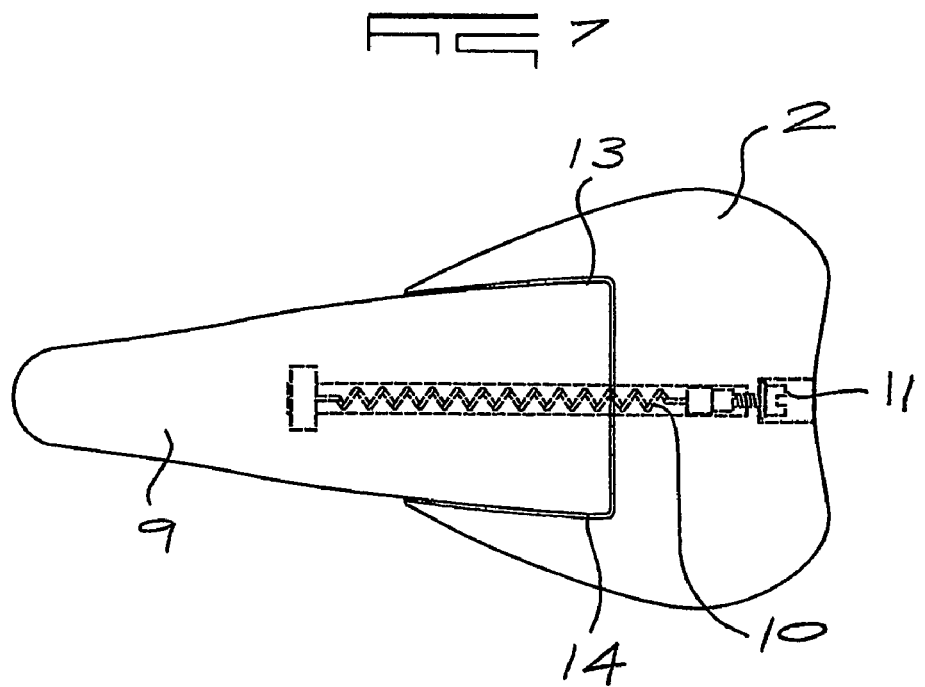

BICYCLE SADDLE

CROSS-REFERENCE TO PRIOR APPLICATION

The above-referenced application is the U.S. National Phase of International Patent Application PCT/IB2004/003908, filed Nov. 30, 2004, which claims priority from South African Application No. 2003/9335, filed Dec. 1, 2003, which is incorporated by reference herein. The International Application was published on Jun. 16, 2005 as WO 2005/054045 A1.

FIELD OF THE INVENTION

This invention relates to a bicycle saddle and more particularly to a saddle which is ergonomically designed.

BACKGROUND TO THE INVENTION

Bicycle saddles have been used to support cyclists ever since bicycles were first made. Since that time they have been subject to development all in order to render them more comfortable to the cyclist.

The problem has been essentially an anatomical one.

The conventional saddle consists of a seat portion which has a forwardly projecting nose portion. The latter provides the cyclist with a degree of lateral support and thus assists balancing of the bicycle and a lateral reaction to the forces which occur as the cyclist peddles.

The two portions of the saddle thus provide for different kinds of support with the nose providing support also against downward movement of part of the body of the cyclist.

More specifically the relationship between the two parts of the saddle relative to the cyclist's body may be described as follows:—

The area of contact of the cyclist's seat with the conventional bicycle saddle consists of two parts:—

1. The first is related to the bony ischial tuberosities lying deep to the skin and subcutaneous tissues of the lower buttock and frequently associated with a bursa which reduces friction. This area is naturally adapted for weight bearing. In the novice cyclist, these areas often become sore and excoriated in a roughly circular zone centered over the ischial tuberosities measuring about 2.5 cm in diameter. This rapidly improves with time and further contact with the posterior part of the saddle as adaptation to weight bearing occurs. The anus which lies between the points of weight bearing is held away from the surface of the saddle by the ischial tuberosities and is not subjected to significant pressure or abrasion.

2. The second part is the perineal area between the upper inner extremities of the thighs anterior to the anus, extending forward to include the base and proximal shaft of the penis and urethra in the male and vulval, clitoral and urethral areas in the female. This part is not in any way adapted to weight bearing and becomes tender, excoriated and swollen in many recreational cyclists. Furthermore, the nose of the conventional saddle is pushed up with considerable force into the area spanned by the bony pubic arch. This causes compression of the veins, nerves and arteries lying in Alcock's canal against the bone, supplying the genital area. This frequently causes pain and numbness in the genital area often referred to the tip of the penis in the male and may in some cases cause impotence. In people such as professional cyclists, prolonged exposure in part 2, the perineal area, can lead to some degree of adaptation. These facts have been well documented and the subject of corresponding medical reports.

The facts referred to are exacerbated in the case of sporting bicycle activities such as racing, touring, or off road cycling where saddles are usually more rigid and of narrow construction. The invention applies particularly to this type of saddle but can also be used for conventional standard kinds of bicycle saddle.

OBJECT OF THE INVENTION

It is the object of the invention to provide a saddle which will at least mitigate the problems associated with the nose portions of a bicycle saddle.

SUMMARY OF THE INVENTION

Accordingly there is provided by this invention a bicycle saddle having a seat portion with load supporting surfaces spaced to bridge the ischial tuberosity of a cyclist and a nose portion extending forwardly between the load supporting surfaces, the nose being longitudinally flexible and laterally rigid.

Further features of the invention provide for the nose portion to be resiliently connected to the seat, for the resilience to be provided by a spring plate of shallow depth compared to its width, and for the nose section to be hinged to the seat.

A further feature of this invention provides for the nose section to be connected to the seat by a tension spring and for the spring to include means for varying its tension.

The invention also provides for the plate to be secured to a frame for the seat and for the saddle cover material to allow free flexibility of the plate in the longitudinal plane of the bicycle.

Still further features of this invention provide for the plate to provide the hinge between the seat and nose portions, for the spring to be anchored in the nose portion and secured to a screwthreaded tensioning member within the seat portion and for the plate to be secured to the under surface of the seat and nose sections.

A still further feature of this invention provides for the end of the nose portion contiguous to the seat position to be rebated into the seat position, for the rebate to be such that movement of the nose portion about the hinge axis maintains the nose portion substantially within the depth of the seat portion and for the upper edges of the rebated portion of the nose to be rounded.

The invention also provides for the seat frame to carry one member of a pivotal joint between the saddle and bicycle frame.

BRIEF DESCRIPTION OF THE DRAWINGS

These and other features of this invention will become apparent from the following description of examples of the invention wherein reference is made to the accompanying drawings in which

FIG. 3 shows a side view of the saddle in its flexible condition;

FIGS. 4 and 5 are similar views to FIGS. 1 and 3 of a different embodiment; and FIGS. 6 and 7 show a still further embodiment.

DETAILED DESCRIPTION OF THE INVENTION

Figure 1:
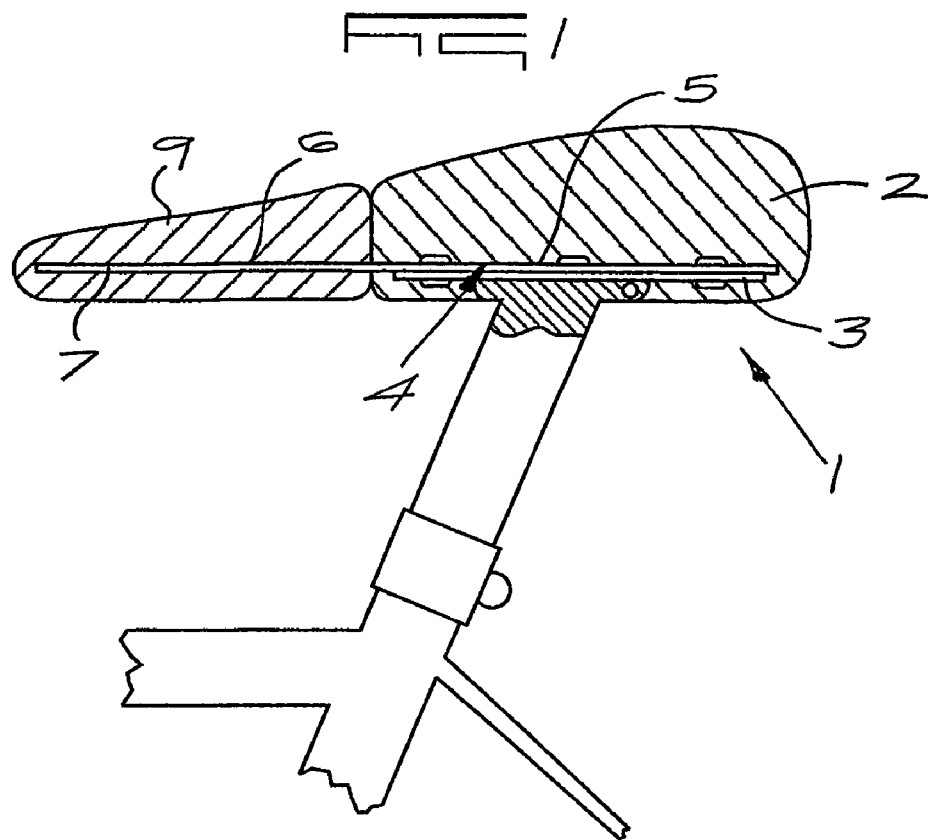
FIGS. 1 and 2 are respectively cross sectional side and plan views of the saddle.
Figure 2:
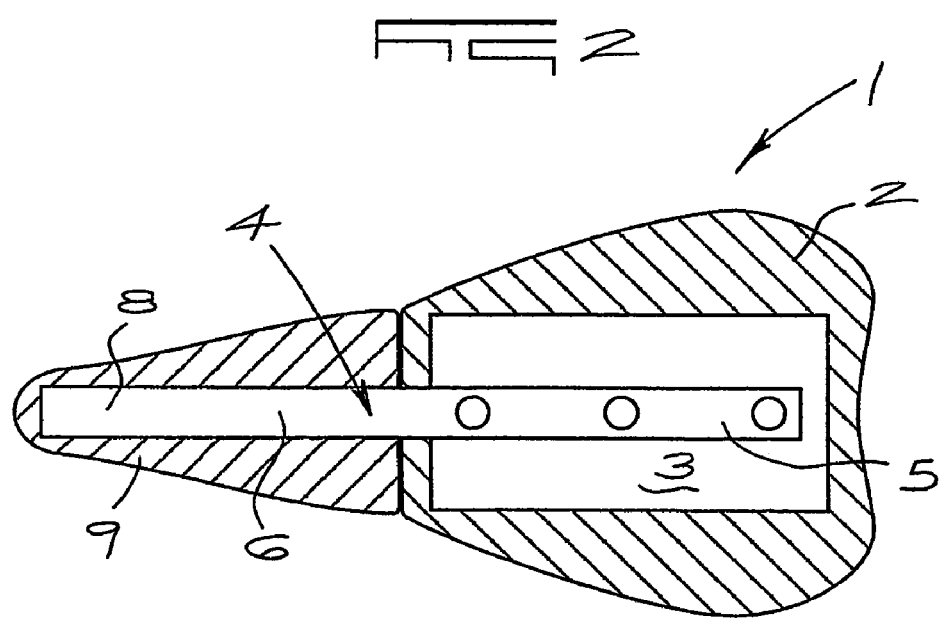

In all the embodiments illustrated the seat portions of the saddle (1) are preferably, but not essentially, designed to provide support directly below the ischial tuberosities of a cyclist.

The seat portion (2) and the structure for attaching the saddle (1) to the frame of a bicycle need not be described in detail as they may vary widely to meet particular requirements not relevant to this invention.

The support (3) for the seat portion (2) has secured thereto a spring plate (4). This plate (4) is secured at end (5) to the seat portion (2) support (3) and has a cantilevered forwardly extending end (6).

The plate (4) is shown to have a shallow depth indicated at (7) but a substantial width indicated at (8). The plate (4) is preferably made of suitable spring steel but it will be appreciated that other materials can be used which will provide similar lateral support and longitudinally flexibility.

The plate (4) is moulded into the separate seat portion (2) and nose portion (9), the material for which will be known to those skilled in the art.

It will be appreciated that the design of the plate (4), including the dimensions and materials from which it is made, will be selected to give a compromise of least pressure to the pelvic area of the cyclist combined with adequate lateral support for the necessary balance of a cyclist during use.

It will be appreciated that the plate (4) has a predetermined fixed resilience and this is not always desirable. The nose portion (9) should flex to meet the variable requirements of cyclists. To provide this for different cyclists additional resilient resistance can be provided by the inclusion of a tension spring (10) between the operatively upper parts of the nose portion (9) and the seat portion (2). The anchor assembly (11) within the seat portion (2) includes a screw (11) which enables the tension of spring (10) to be adjusted as required. This embodiment is illustrated in FIGS. 4 and 5.

Referring to both of these embodiments, the nose portion (9) of the saddle (1) has an outer resilient covering similar to that of seat portion (2). These coverings are however separate but they may have an outer elastic or foldable sheath (not shown) which enables the nose portion (9) to flex relative to the seat portion (2) as shown in FIGS. 3 and 5 but without resulting in the gap (12) between the portions. As an alternative, suitably flexible or deformable material may be used to bridge the area between the nose (9) and seat portions (2) where the gap (12) would otherwise be formed.

The saddle (1) has the advantages of the stability of the conventional fixed nose saddle providing balance to the cyclist. However the downward resilient flexibility under low pressure prevents the discomfort, and sometimes serious damage to the soft tissue to the pelvic outlet area of the cyclist. The combination of the spring plate (4) and tension spring (10) enables the benefits of the flexibility to be optimized.

It will however be appreciated that the saddle may be varied in many ways from the embodiments described without departing from the scope of the invention.

For example the flexible movement of the nose portion (9) can be obtained using a hinge assembly biased to hold the nose portion (9) in its normal position but allowing the hinge to open when downward pressure is exerted on the nose portion (9).

One such further modified embodiment is illustrated in FIGS. 6 and 7. In this embodiment the nose portion (9) has its end contiguous to the seat portion (2) enlarged and the upper edges (13) of this end are rounded.

The end is rebated at (14) into the front end of the seat portion (2) as shown and the components are so chosen that the movement of the nose portion (9) relative to the seat portion (2) substantially avoids the formulation of the gap (12) when the nose portion (9) is flexed downwardly. This is achieved by securing the plate (4) to the under surfaces of the saddle portions (2) and (9).

As an example of a further variation the flexible characteristics can be obtained during a moulding process wherein the saddle portions are moulded integrally from suitable synthetic resin materials.

The invention thus provides a saddle (1) which is both safe and comfortable in use.

The invention claimed is:

1. A bicycle saddle comprising:
   a one-piece seat portion having load supporting surfaces laterally spaced apart that is to be fixedly mounted to the frame of a bicycle;
   a nose portion extending forwardly from the seat portion and having an end that is contiguous with a forward end of the seat portion and having an extending part that is rebated into a slot in a central area of the seat portion beginning at the seat portion forward end; and
   a hinge that is flexible and laterally rigid connecting said nose portion to said seat portion to allow the nose portion to flex relative to the fixedly mounted seat portion.

2. A bicycle saddle as defined in claim 1 in which each of the seat portion and the nose portion is molded from synthetic resin materials.

3. A bicycle saddle as defined in claim 1 wherein the hinge is flexible only vertically.

4. A bicycle saddle as defined in claim 1 wherein the hinge comprises a spring plate positioned between and secured to the nose portion and the seat portion.

5. A bicycle saddle as defined in claim 4 wherein said hinge further comprises a tension spring between the nose portion and seat portion.

6. A bicycle saddle as defined in claim 5 further comprising an adjustment means to vary the tension in the spring.

7. A bicycle saddle as defined in claim 6 wherein the adjustment means is a screw engaging one end of the tension spring.

8. A bicycle saddle as defined in claim 4 wherein the spring plate is secured to the under surfaces of the nose portion and seat portion.

* * * * *